United States Patent
Fyock

(10) Patent No.: US 10,797,456 B1
(45) Date of Patent: Oct. 6, 2020

(54) OUTLET RELOCATION ASSEMBLY

(71) Applicant: David Fyock, Clymer, PA (US)

(72) Inventor: David Fyock, Clymer, PA (US)

( * ) Notice: Subject to any disclaimer, the term of this patent is extended or adjusted under 35 U.S.C. 154(b) by 0 days.

(21) Appl. No.: 16/368,048

(22) Filed: Mar. 28, 2019

(51) Int. Cl.
  *H01R 39/00* (2006.01)
  *H01R 39/64* (2006.01)
  *H02G 11/00* (2006.01)
  *H01R 13/516* (2006.01)
  *H01R 25/00* (2006.01)

(52) U.S. Cl.
  CPC ........... *H01R 39/64* (2013.01); *H01R 13/516* (2013.01); *H01R 25/003* (2013.01); *H02G 11/00* (2013.01)

(58) Field of Classification Search
  CPC ......... H01R 35/04; H01R 27/00; H01R 31/06
  See application file for complete search history.

(56) References Cited

U.S. PATENT DOCUMENTS

| | | | |
|---|---|---|---|
| 5,895,275 A * | 4/1999 | Harbertson | H01R 25/003 439/21 |
| 5,957,701 A | 9/1999 | McMillin | |
| 6,004,138 A | 12/1999 | Harbertson | |
| 6,068,490 A * | 5/2000 | Salzberg | H01R 39/64 439/22 |
| 6,638,074 B1 * | 10/2003 | Fisher | H01R 35/04 439/18 |
| 7,997,546 B1 * | 8/2011 | Andersen | F16B 2/08 248/214 |
| 8,802,985 B2 | 8/2014 | Lettkeman | |
| 9,124,044 B2 * | 9/2015 | Beldock | H01R 25/006 |
| 9,742,094 B1 | 8/2017 | Grunberger | |
| 2014/0213072 A1 * | 7/2014 | Cheng | H01R 35/00 439/18 |
| 2017/0302026 A1 | 10/2017 | Tymus | |
| 2017/0346244 A1 | 11/2017 | Comis | |

* cited by examiner

Primary Examiner — Xuong M Chung Trans

(57) ABSTRACT

An outlet relocation assembly includes a male electrical outlet that can be plugged into a female electrical outlet on a wall that is blocked by furniture. A ring is rotatably positioned around the male electrical outlet. An arm is coupled to and extends away from the ring such that the arm is oriented parallel to the wall in which the female electrical outlet in the wall is positioned. A female electrical outlet is pivotally coupled to the arm. The female electrical outlet on the arm can be spaced from the female electrical outlet in the wall thereby facilitating the female electrical outlet on the arm to be extended beyond the furniture. Moreover, the female electrical outlet on the arm is in electrical communication with the male electrical outlet to supply electrical power.

6 Claims, 7 Drawing Sheets

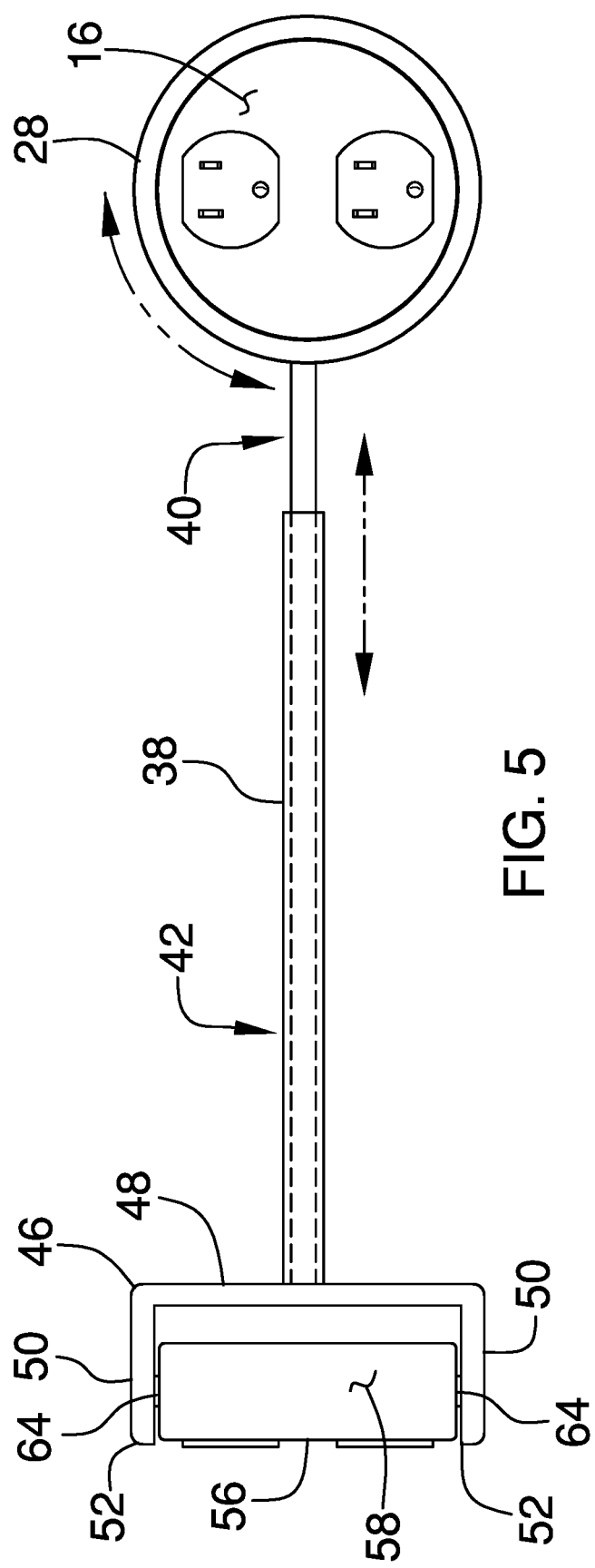
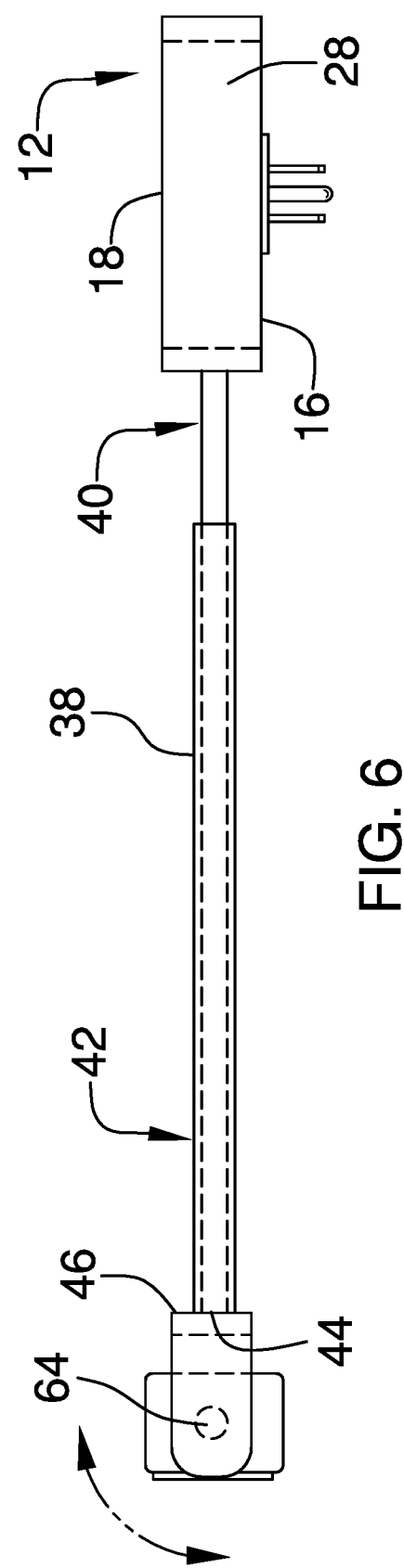
FIG. 5
FIG. 6

US 10,797,456 B1

OUTLET RELOCATION ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to relocation devices and more particularly pertains to a new relocation device for relocating an electrical outlet that is blocked by an article of furniture or the like.

BRIEF SUMMARY OF THE INVENTION

An embodiment of the disclosure meets the needs presented above by generally comprising a male electrical outlet that can be plugged into a female electrical outlet on a wall that is blocked by furniture or other object. A ring is rotatably positioned around the male electrical outlet. An arm is coupled to and extends away from the ring such that the arm is oriented parallel to the wall in which the female electrical outlet in the wall is positioned. A female electrical outlet is pivotally coupled to the arm. The female electrical outlet on the arm can be spaced from the female electrical outlet in the wall thereby facilitating the female electrical outlet on the arm to be extended beyond the furniture. Moreover, the female electrical outlet on the arm is in electrical communication with the male electrical outlet to supply electrical power.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is a back phantom view of an embodiment of the disclosure.

FIG. 6 is a top phantom view of an embodiment of the disclosure.

DETAILED DESCRIPTION OF THE INVENTION

Figure 1:
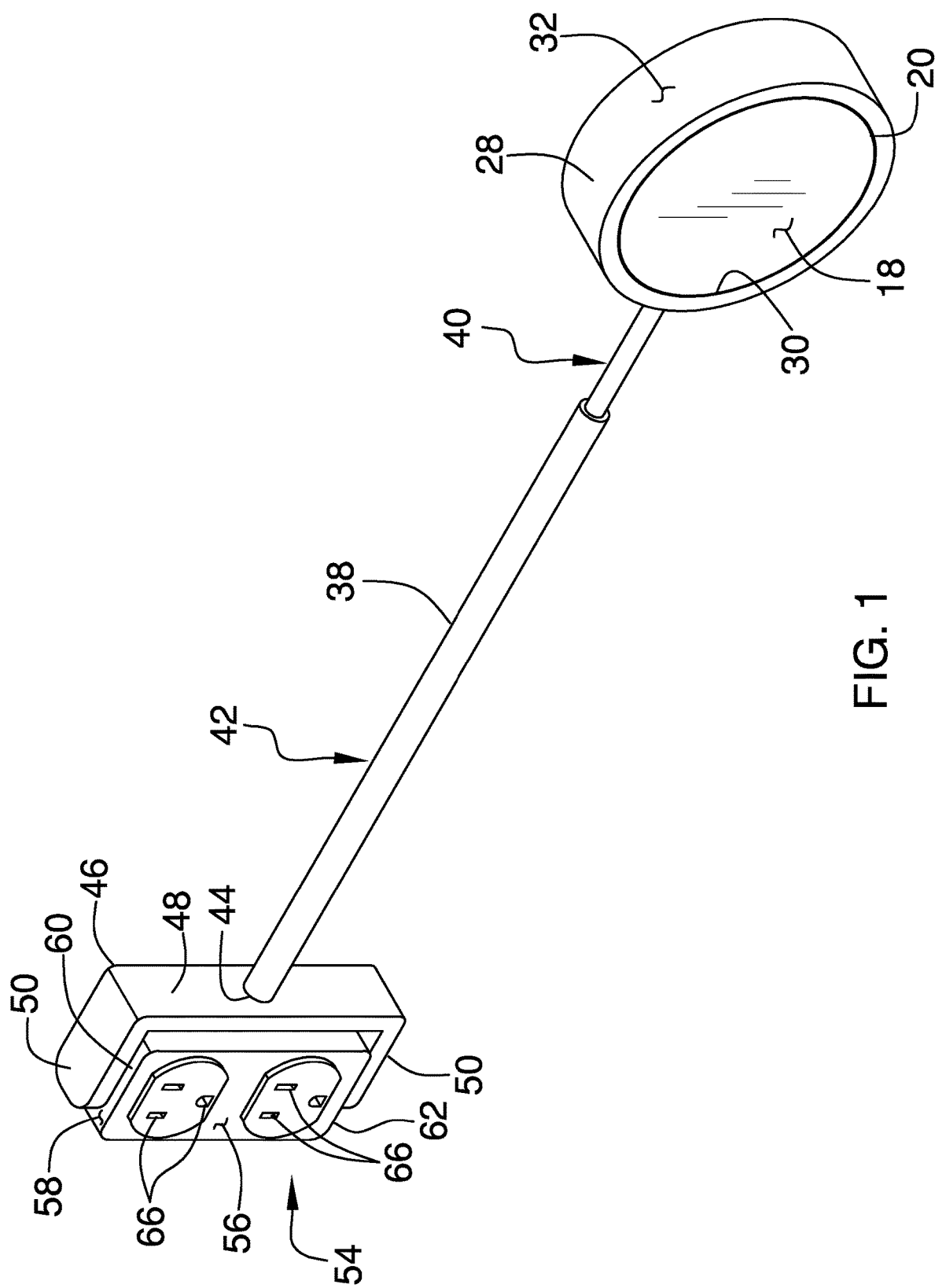
FIG. 1 is a front perspective view of an outlet relocation assembly according to an embodiment of the disclosure.
Figure 2:
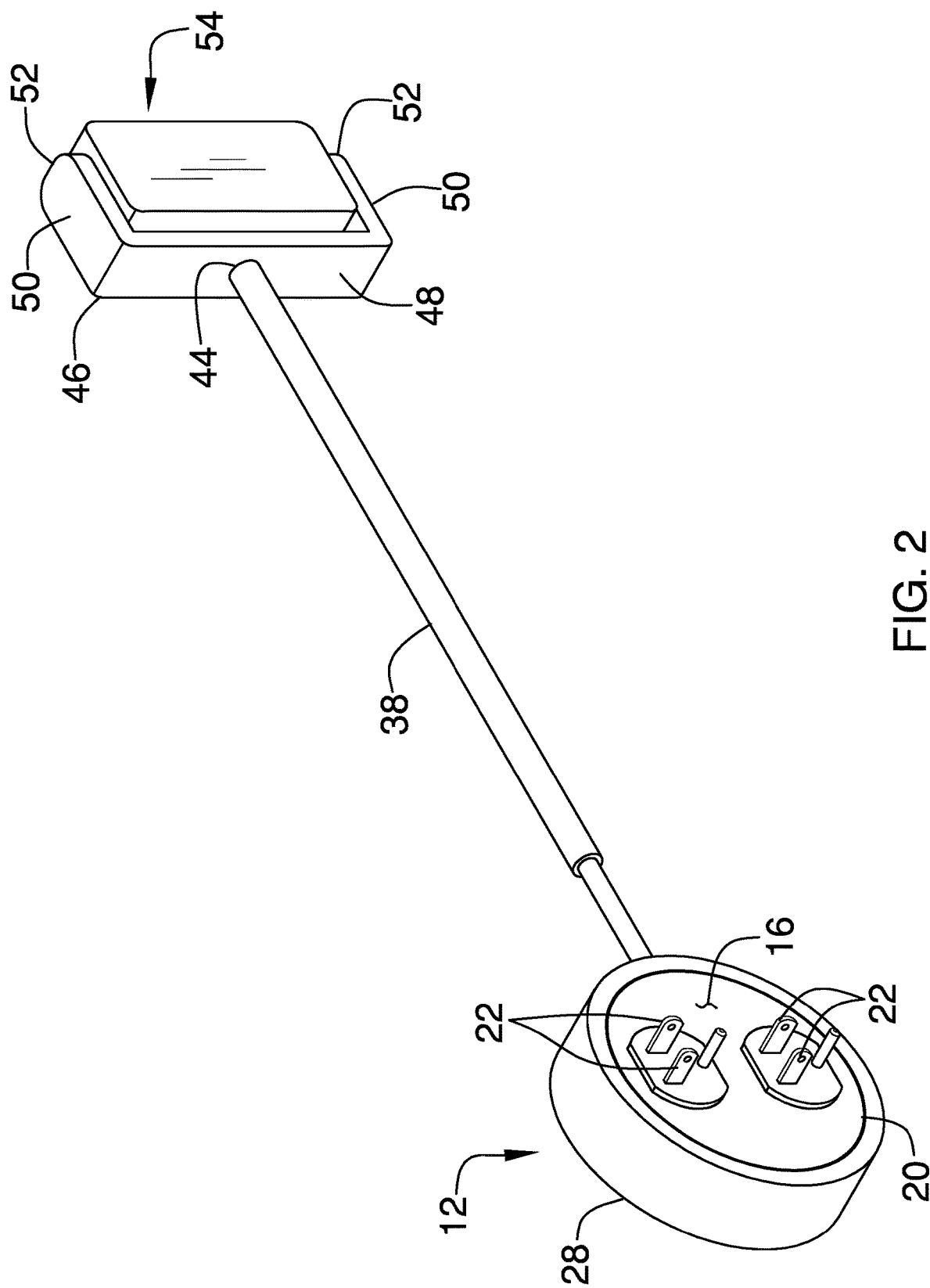
FIG. 2 is a back perspective view of an embodiment of the disclosure.
Figure 3:
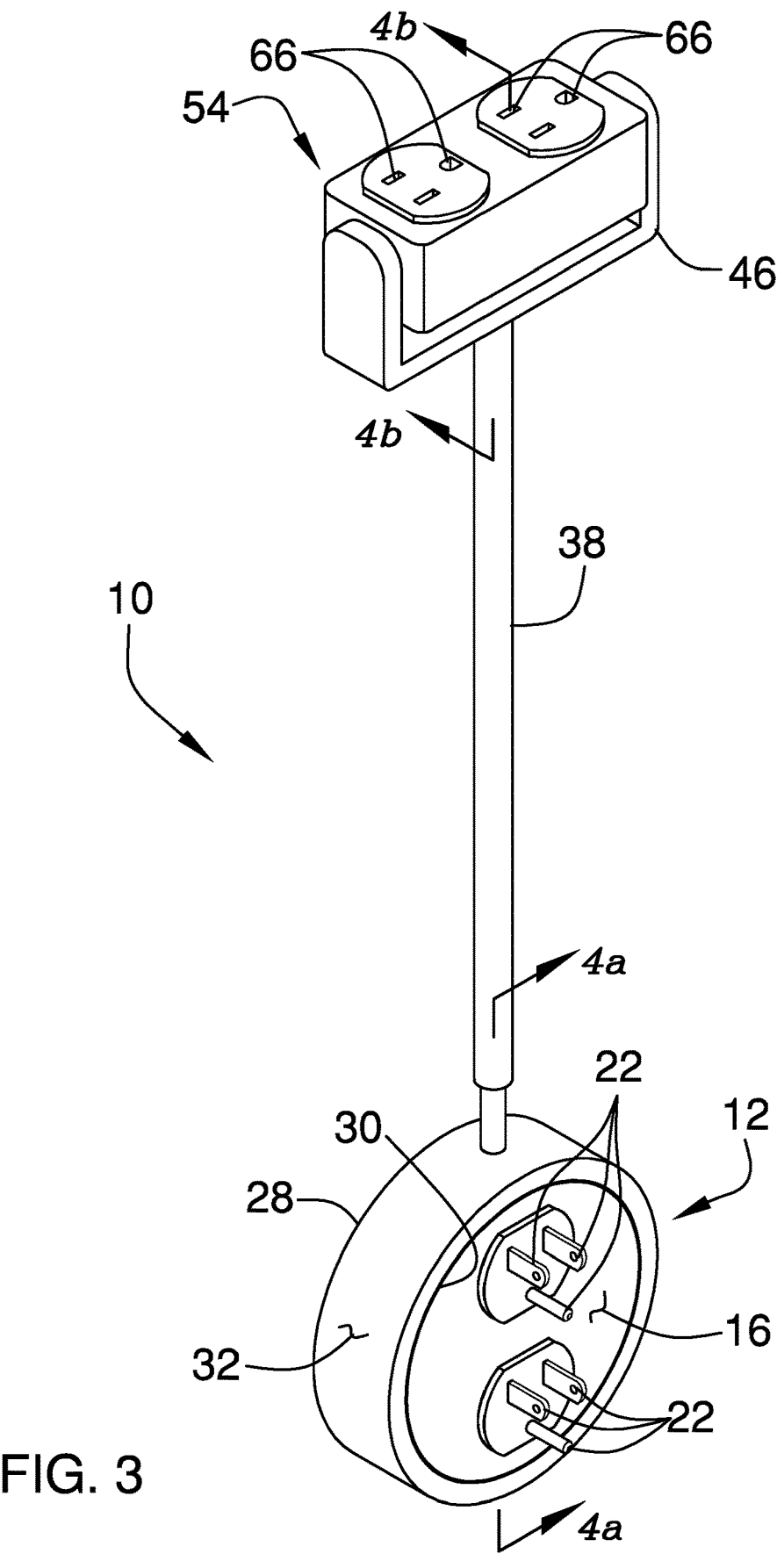
FIG. 3 is a back perspective view of an embodiment of the disclosure showing a female electrical outlet being pivoted.
Figure 4A:
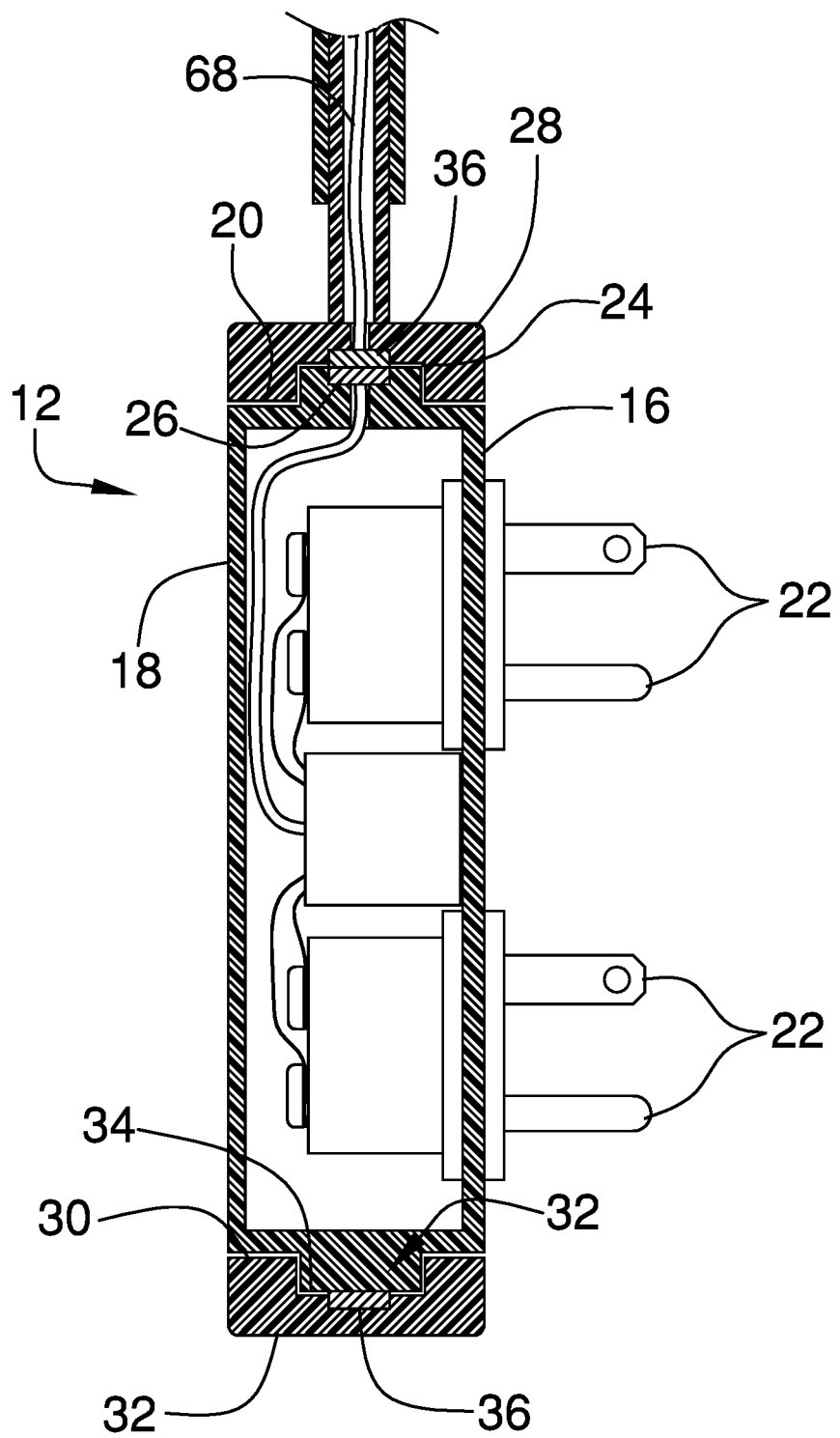
FIG. 4a is a cross sectional view taken along line 4a of FIG. 3 of an embodiment of the disclosure.
Figure 4B:
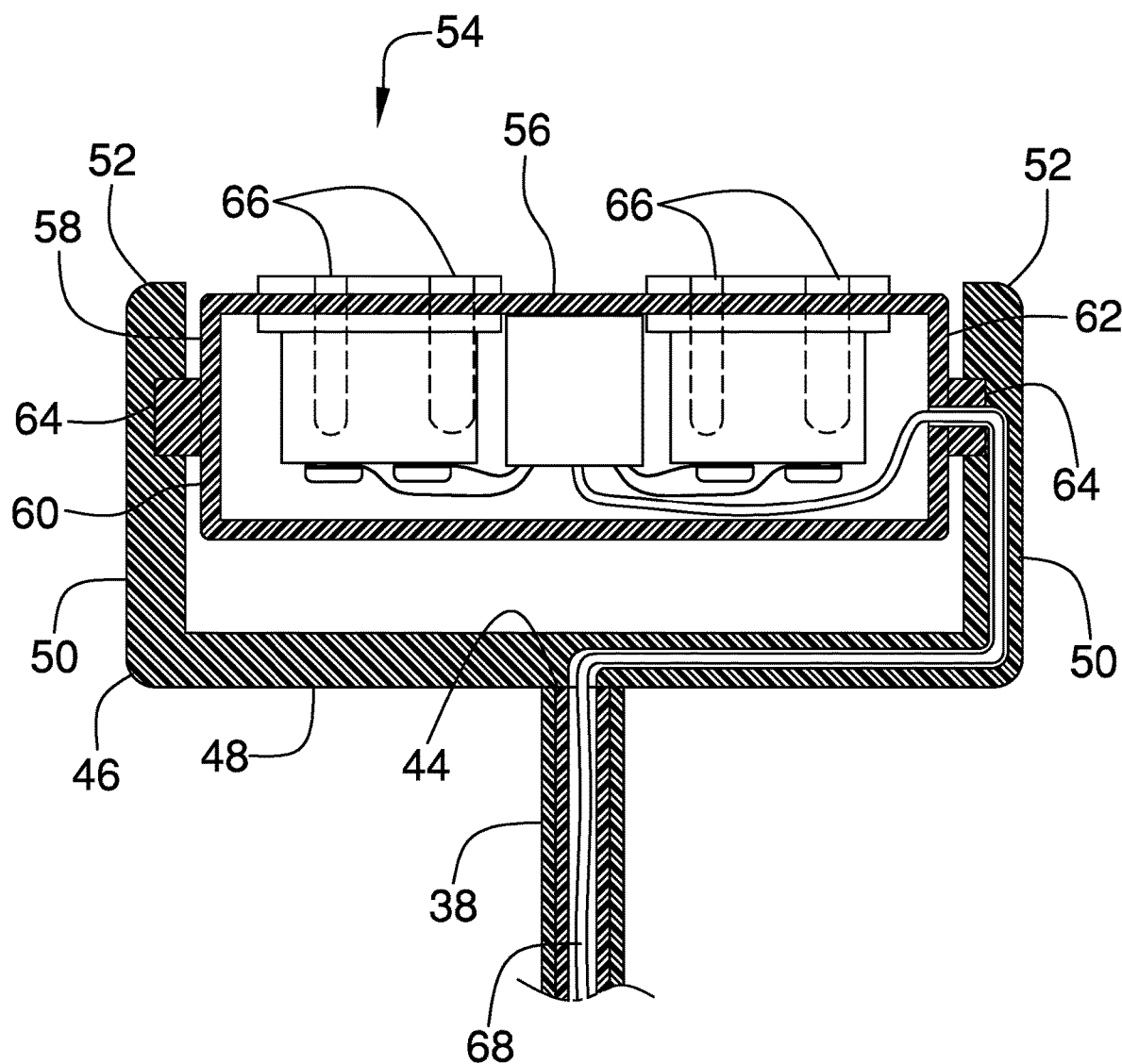
FIG. 4b is a cross sectional view taken along lie 4b of FIG. 3 of an embodiment of the disclosure.
Figure 7:
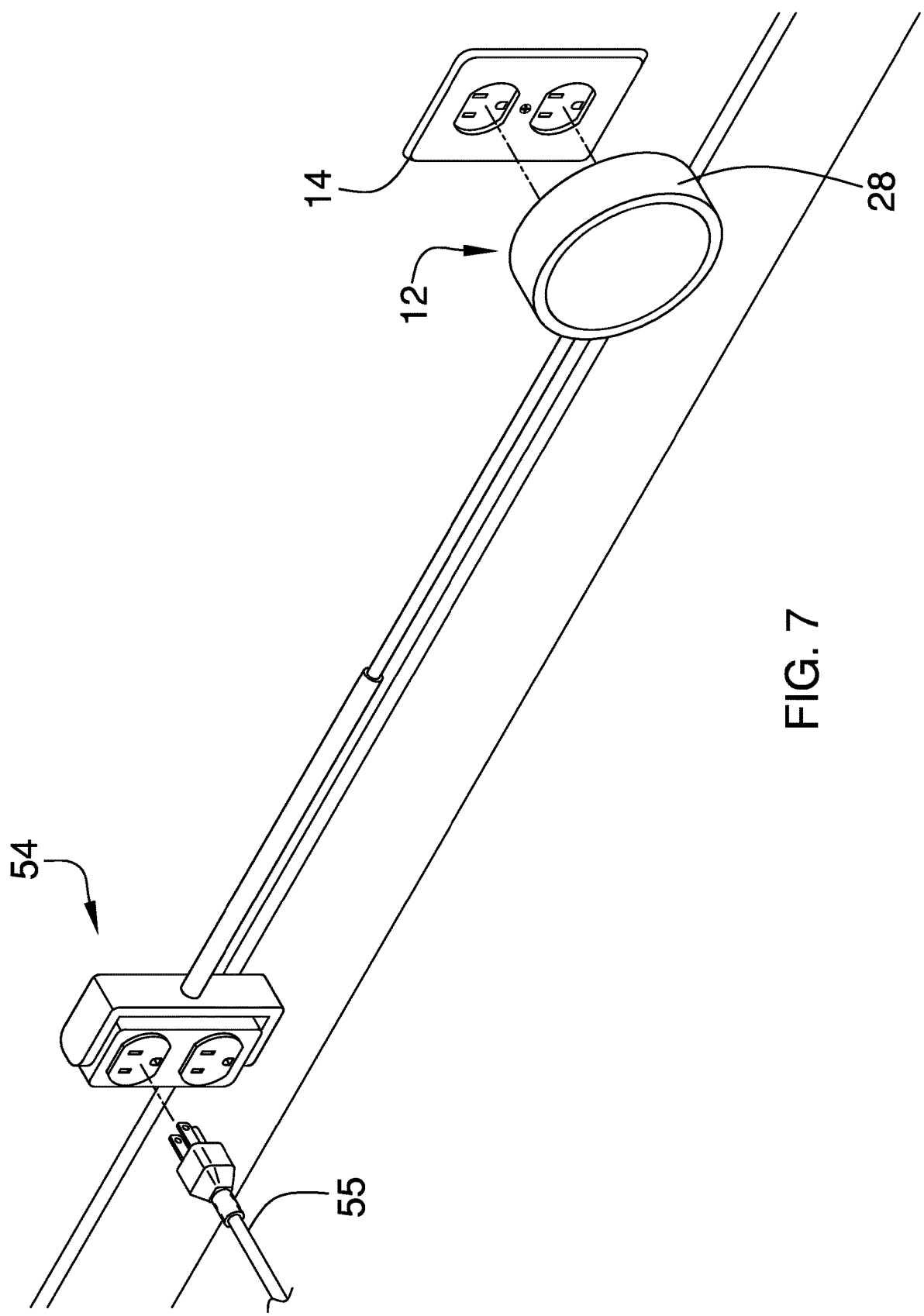
FIG. 7 is a perspective in-use view of an embodiment of the disclosure.

With reference now to the drawings, and in particular to FIGS. 1 through 7 thereof, a new relocation device embodying the principles and concepts of an embodiment of the disclosure and generally designated by the reference numeral 10 will be described.

As best illustrated in FIGS. 1 through 7, the outlet relocation assembly 10 generally comprises a male electrical outlet 12 that can be plugged into a female electrical outlet on a wall 14 that is blocked by furniture or other object. The male electrical outlet 12 has a first surface 16, a second surface 18 and a perimeter surface 20 extending therebetween. The perimeter surface 20 is continuously arcuate such that the male electrical outlet 12 has a disk shape. Additionally, the male electrical outlet 12 includes a plurality of first contacts 22 that is each coupled to and extends away from the first surface 16. Each of the first contacts 22 can be plugged into the female electrical outlet on the wall 14. The perimeter surface 20 has a ridge 24 extending outwardly therefrom and the ridge 24 extends around an entire circumference of the perimeter surface 20.

A second contact 26 is coupled to the ridge 24 on the perimeter surface 20 of the male electrical outlet 12 such that the second contact 26 is exposed with respect to the ridge 24. Moreover, the second contact 26 is electrically coupled to each of the first contacts 22 such that the second contact 26 is in electrical communication with the female electrical outlet in the wall 14. A ring 28 is rotatably positioned around the male electrical outlet 12, and the ring 28 has an inside surface 30 and an outside surface 30. The inside surface 30 has a slot 32 extending toward the outside surface 30 and the slot 32 extends around a full circumference of the inside surface 30. The slot 32 receives the ridge 24 such that the ring 28 is retained on the male electrical outlet 12 and the slot 32 has a lower bounding surface 34.

A third contact 36 is provided and the third contact 36 is coupled to the ring 28. The third contact 36 is positioned on the lower bounding surface 34 of the slot 32 and the third contact 36 extends around an entire circumference of the ring 28. Moreover, the third contact 36 engages the second contact 26. In this way the third contact 36 is in continuous electrical communication with the second contact 26 when the ring 28 is rotated around the perimeter surface 20 of the male electrical outlet 12.

An arm 38 is coupled to and extends away from the ring 28. Thus, the arm 38 is oriented parallel to the wall in which the female electrical outlet in the wall 14 is positioned when the male electrical outlet 12 is plugged into the female electrical outlet in the wall 14. The arm 38 includes a first section 40 that slidably engages a second section 42 such that the arm 38 has a telescopically adjustable length. The arm 38 has a distal end 44 with respect to the ring 28 and the arm 38 is positionable at a selected point of rotation about the female electrical outlet 54.

A bracket 46 is provided and the bracket 46 is coupled to the distal end 44 of the arm 38. The bracket 46 comprises a central member 48 that extends between a pair of outward members 50 such that the bracket 46 has a U shape. Each of the outward members 50 has a distal end 52 with respect to the central member 48. Moreover, the distal end 44 of the arm 38 is coupled to the central member 48 having each of the outward members 50 extending away from the arm 38.

A female electrical outlet 54 is provided and the female electrical outlet 54 is pivotally coupled to the arm 38. In this way the female electrical outlet 54 on the arm 38 is spaced from the female electrical outlet in the wall 14 thereby facilitating the female electrical outlet 54 on the arm 38 to be extended beyond the furniture. Thus, an electrical device 55 can be plugged into the female electrical outlet 54 on the arm 38 in lieu of the female electrical outlet in the wall 14 that is blocked by the furniture. The female electrical outlet 54 on the arm 38 is in electrical communication with the male electrical outlet 12 such that the female electrical outlet 54 on the arm 38 can supply electrical power to the electrical device 55.

The female electrical outlet 54 has a forward surface 56 and an outer surface 58, and the outer surface 58 has a top side 60 and a bottom side 62. Each of the top 60 and bottom 62 sides of the outer surface 58 has a pivot point 64 thereon. Moreover, the pivot point 64 on each of the top 60 and bottom 62 sides pivotally engages a respective one of the outward members 50 of the bracket 46 at a point that is located adjacent to the distal end 52 of the respective outward member 50. The forward surface 56 has a plurality of sockets 66 therein and a plug of the electrical device 55 can be plugged into respective ones of the sockets 66.

A conductor 68 is provided and the conductor 68 is electrically coupled to the third contact 36. The conductor 68 extends through the arm 38 and outwardly through pivot point 64 on the top side 60 of the outer surface 58 of the female electrical outlet 54 on the arm 38. Additionally, the conductor 68 is electrically coupled to each of the sockets 66 such that each of the sockets 66 is in electrical communication with each of the first contacts 22 on the male electrical outlet 12.

In use, the male electrical outlet 12 is plugged into the female electrical outlet in the wall 14 that is blocked by the furniture. The arm 38 is manipulated to position the female electrical outlet 54 on the arm 38 a selected distance from the female electrical outlet in the wall 14. In this way the female electrical outlet 54 on the arm 38 can be located beyond the furniture that is blocking the female electrical outlet in the wall 14. Additionally, the ring 28 can be rotated to position the female electrical outlet 54 on the arm 38 at a selected height. In this way the electrical device 55 can receive electrical current from the female electrical outlet in the wall 14 without having to relocate the furniture.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An outlet relocation assembly being configured to relocate an electrical outlet that is blocked by furniture, said assembly comprising:

a male electrical outlet being configured to be plugged into a female electrical outlet on a wall that is blocked by furniture, said male electrical outlet having a first surface, a second surface and a perimeter surface extending therebetween, said perimeter surface being continuously arcuate such that said male electrical outlet has a disk shape, said male electrical outlet including a plurality of first contacts each being coupled to and extending away from said first surface wherein each of said first contacts is configured to be plugged into the female electrical outlet on the wall;

a ridge extending outwardly from said perimeter surface, said ridge extending around an entire circumference of said perimeter surface;

a ring being rotatably positioned around said male electrical outlet, said ring fully covering a circumference and width of said perimeter surface;

an arm being coupled to and extending away from said ring wherein said arm is configured to be oriented parallel to the wall in which the female electrical outlet in the wall is positioned;

a female electrical outlet being pivotally coupled to said arm wherein said female electrical outlet on said arm is configured to be spaced from the female electrical outlet in the wall thereby facilitating said female electrical outlet on said arm to be extended beyond the furniture, said female electrical outlet on said arm being in electrical communication with said male electrical outlet wherein said female electrical outlet on said arm is configured to supply electrical power;

a second contact being coupled to said ridge on said perimeter surface of said male electrical outlet such that said second contact is exposed with respect to said ridge, said second contact being electrically coupled to each of said first contacts wherein said second contact is configured to be in electrical communication with the female electrical outlet in the wall;

said ring having an inside surface and an outside surface, said inside surface having a slot extending toward said outside surface, said slot extending around a full circumference of said inside surface, said slot receiving said ridge such that said ring is retained on said male electrical outlet, said slot having a lower bounding surface; and a third contact being coupled to said ring, said third contact being in electrical communication with said first contacts, said third contact being positioned on said lower bounding surface of said slot, said third contact extending around an entire circumference of said ring, said third contact engaging said second contact such that said third contact is in continuous electrical communication with said second contact when said ring is rotated around said perimeter surface of said male electrical outlet.

2. The assembly according to claim 1, wherein said arm includes a first section slidably engaging a second section such that said arm has a telescopically adjustable length, said arm having a distal end with respect to said ring, said arm being positionable at a selected point of rotation about said female electrical outlet.

3. The assembly according to claim 2, further comprising a bracket being coupled to said distal end of said arm, said bracket comprising a central member extending between a pair of outward members such that said bracket has a U shape, each of said outward members having a distal end with respect to said central member, said distal end of said arm being coupled to said central member having each of said outward members extending away from said arm.

4. The assembly according to claim 3, wherein said female electrical outlet has a forward surface and an outer surface, said outer surface having a top side and a bottom side, each of said top and bottom sides of said outer surface having a pivot point thereon, said pivot point on each of said top and bottom sides pivotally engaging a respective one of said outward members of said bracket at a point being located adjacent to said distal end of said respective outward member, said forward surface having a plurality of sockets therein wherein each of said sockets is configured to have a plug of an electrical device plugged therein.

5. The assembly according to claim 4, further comprising:
a plurality of first contacts, each of said first contacts being coupled to said male electrical outlet;
a second contact being coupled to said male electrical outlet, said second contact being in electrical communication with each of said first contacts;
a third contact being coupled to said ring; and
a conductor being electrically coupled to said third contact, said conductor extending through said arm and outwardly through pivot point on said top side of said outer surface of said female electrical outlet on said arm, said conductor being electrically coupled to each of said sockets such that each of said sockets is in electrical communication with each of said first contacts on said male electrical outlet.

6. An outlet relocation assembly being configured to relocate an electrical outlet that is blocked by furniture, said assembly comprising:
a male electrical outlet being configured to be plugged into a female electrical outlet on a wall that is blocked by furniture, said male electrical outlet having a first surface, a second surface and a perimeter surface extending therebetween, said perimeter surface being continuously arcuate such that said male electrical outlet has a disk shape, said male electrical outlet including a plurality of first contacts each being coupled to and extending away from said first surface wherein each of said first contacts is configured to be plugged into the female electrical outlet on the wall, said perimeter surface having a ridge extending outwardly therefrom, said ridge extending around an entire circumference of said perimeter surface;
a second contact being coupled to said ridge on said perimeter surface of said male electrical outlet such that said second contact is exposed with respect to said ridge, said second contact being electrically coupled to each of said first contacts wherein said second contact is configured to be in electrical communication with the female electrical outlet in the wall;
a ring being rotatably positioned around said male electrical outlet, said ring fully covering a circumference and width of said perimeter surface, said ring having an inside surface and an outside surface, said inside surface having a slot extending toward said outside surface, said slot extending around a full circumference of said inside surface, said slot receiving said ridge such that said ring is retained on said male electrical outlet, said slot having a lower bounding surface;
a third contact being coupled to said ring, said third contact being in electrical communication with said first contacts, said third contact being positioned on said lower bounding surface of said slot, said third contact extending around an entire circumference of said ring, said third contact engaging said second contact such that said third contact is in continuous electrical communication with said second contact when said ring is rotated around said perimeter surface of said male electrical outlet;
an arm being coupled to and extending away from said ring wherein said arm is configured to be oriented parallel to the wall in which the female electrical outlet in the wall is positioned, said arm including a first section slidably engaging a second section such that said arm has a telescopically adjustable length, said arm having a distal end with respect to said ring, said arm being positionable at a selected point of rotation about said female electrical outlet;
a bracket being coupled to said distal end of said arm, said bracket comprising a central member extending between a pair of outward members such that said bracket has a U shape, each of said outward members having a distal end with respect to said central member, said distal end of said arm being coupled to said central member having each of said outward members extending away from said arm;
a female electrical outlet being pivotally coupled to said arm wherein said female electrical outlet on said arm is configured to be spaced from the female electrical outlet in the wall thereby facilitating said female electrical outlet on said arm to be extended beyond the furniture, said female electrical outlet on said arm being in electrical communication with said male electrical outlet wherein said female electrical outlet on said arm is configured to supply electrical power, said female electrical outlet having a forward surface and an outer surface, said outer surface having a top side and a bottom side, each of said top and bottom sides of said outer surface having a pivot point thereon, said pivot point on each of said top and bottom sides pivotally engaging a respective one of said outward members of said bracket at a point being located adjacent to said distal end of said respective outward member, said forward surface having a plurality of sockets therein wherein each of said sockets is configured to have a plug of an electrical device plugged therein; and a conductor being electrically coupled to said third contact, said conductor extending through said arm and outwardly through pivot point on said top side of said outer surface of said female electrical outlet on said arm, said conductor being electrically coupled to each of said sockets such that each of said sockets is in electrical communication with each of said first contacts on said male electrical outlet.

\* \* \* \* \*